United States Patent [19]

Auth

[11] Patent Number: 4,810,092
[45] Date of Patent: Mar. 7, 1989

[54] ECONOMICAL SPECTROMETER UNIT HAVING SIMPLIFIED STRUCTURE

[75] Inventor: Gerald L. Auth, Laguna Beach, Calif.

[73] Assignee: Midac Corporation, Costa Mesa, Calif.

[21] Appl. No.: 91,202

[22] Filed: Aug. 31, 1987

Related U.S. Application Data

[63] Continuation-in-part of Ser. No. 832,520, Feb. 21, 1986, abandoned.

[51] Int. Cl.$^4$ ............................ G01B 9/02; G02B 7/18
[52] U.S. Cl. .................................... 356/346; 356/244; 350/321; 350/631
[58] Field of Search ....................... 356/244, 246, 346; 350/321, 631, 632

[56] References Cited

U.S. PATENT DOCUMENTS

| | | | |
|---|---|---|---|
| 3,208,344 | 9/1965 | Staunton | 350/321 |
| 3,701,589 | 10/1972 | Haines | 356/331 |
| 4,494,830 | 1/1985 | Grainge et al. | 350/321 |
| 4,601,579 | 7/1986 | Pritchard et al. | 356/349 |
| 4,637,695 | 1/1987 | Perkins | 350/486 |
| 4,726,657 | 2/1988 | Perkins et al. | 356/244 |

Primary Examiner—Vincent P. McGraw
Assistant Examiner—S. A. Turner
Attorney, Agent, or Firm—Thomas J. Plante

[57] ABSTRACT

A spectrometer construction is shown in which the chassis of the spectrometer is fabricated by stamping, punching, and bending sheet metal. The mirror supports and other elements are also formed from sheet metal. Precision locations are assured by tab and slot, or half-shear and recess, matching of the sheet metal parts. The mirrors in the spectrometer (other than those in the interferometer) are secured directly to vertical sheet-metal walls without intervening adjustments. The mirrors have unitary reflection and backing structures formed either by a diamond-cutting lathe, or by precision plastic molding. The same mirror locating means are used both during formation of each curved mirror surface and also in assembling of the mirror body in the spectrometer.

32 Claims, 15 Drawing Sheets

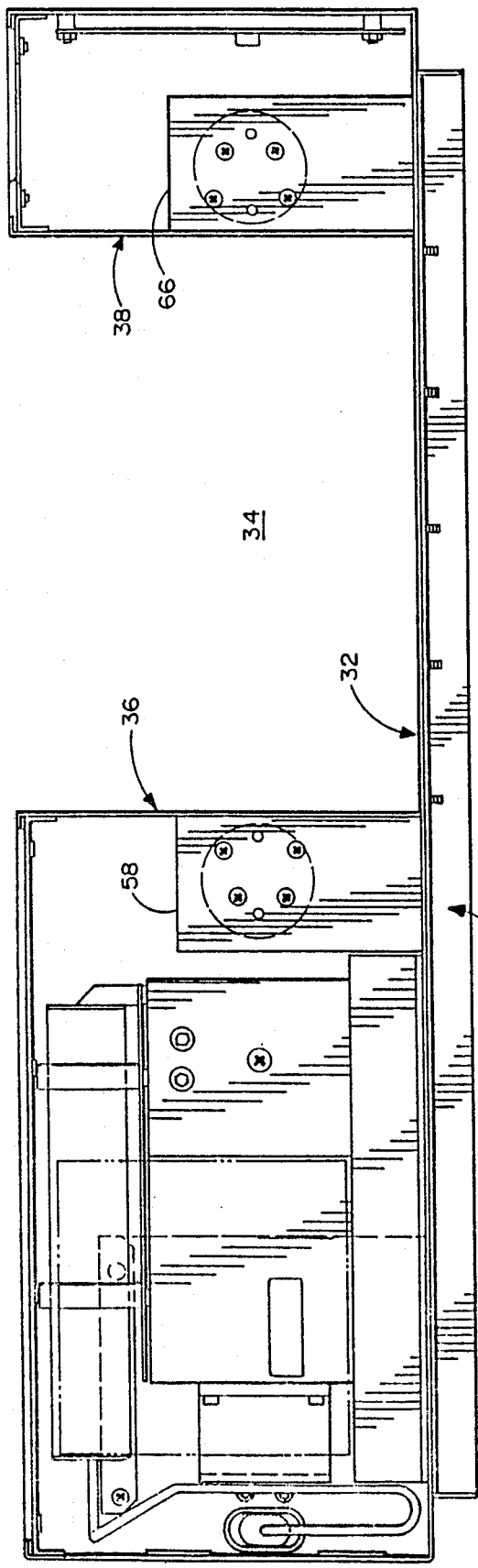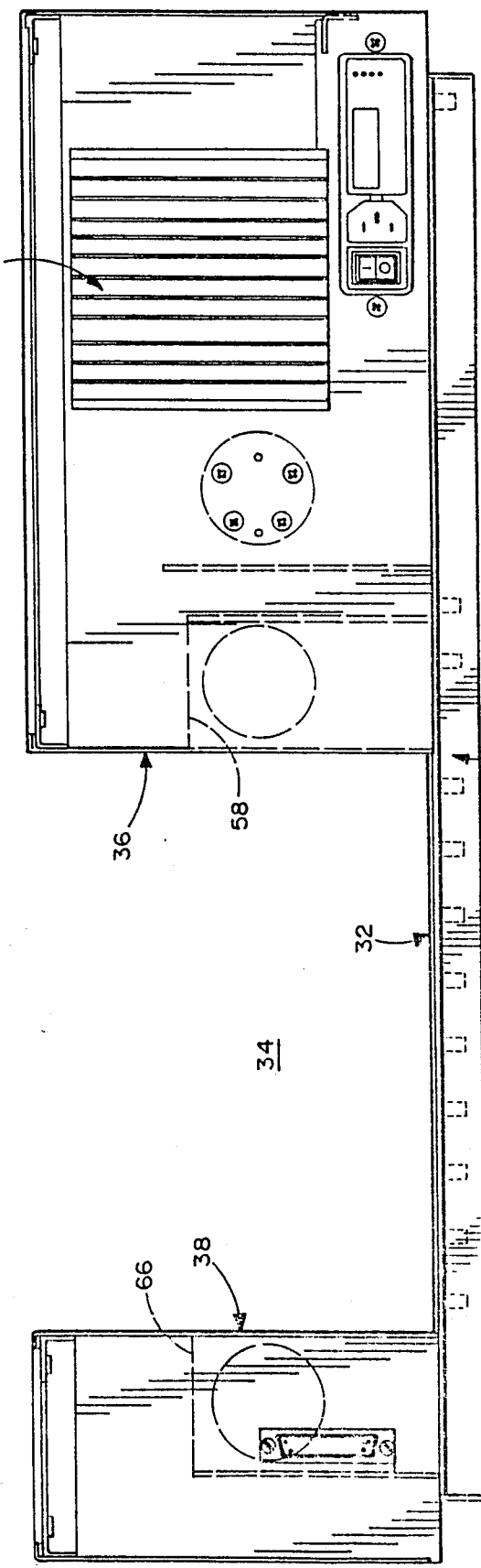
FIG. 2
FIG. 3

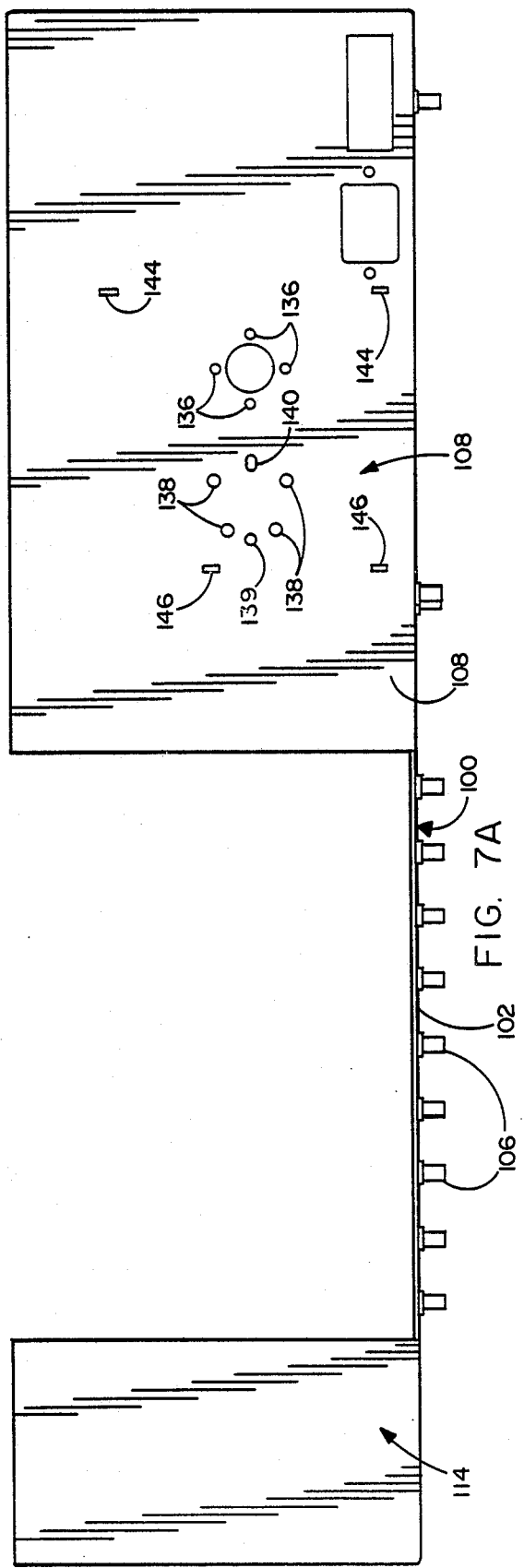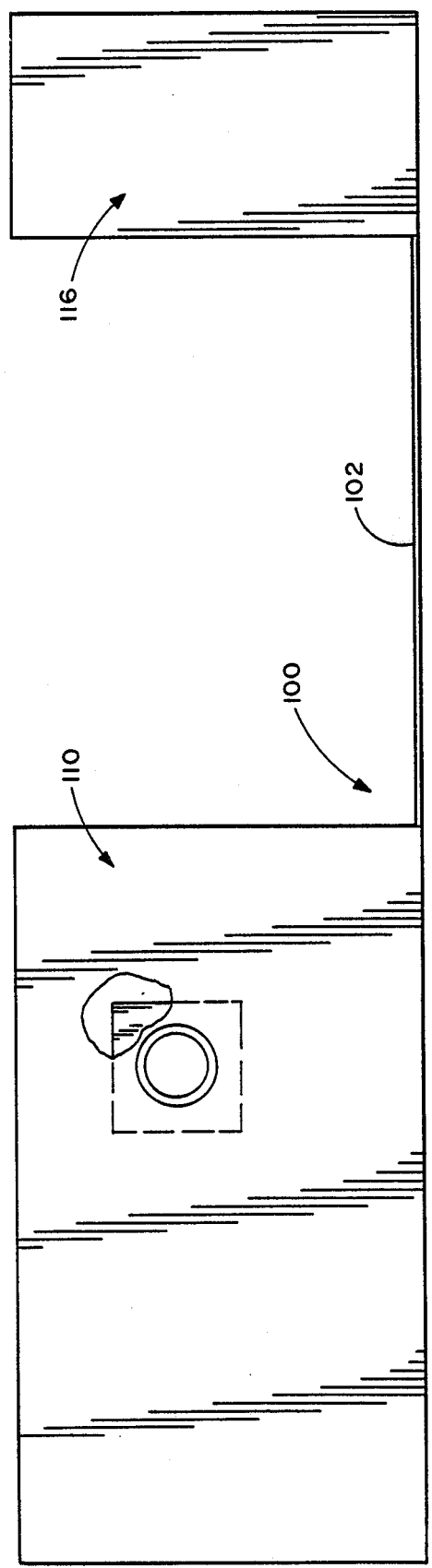

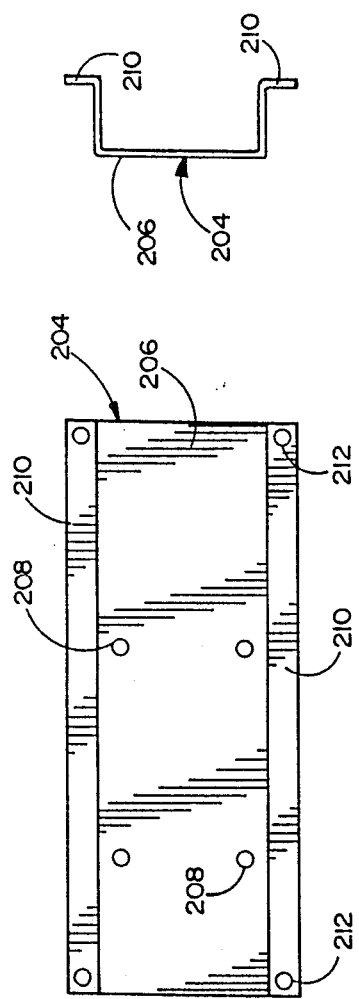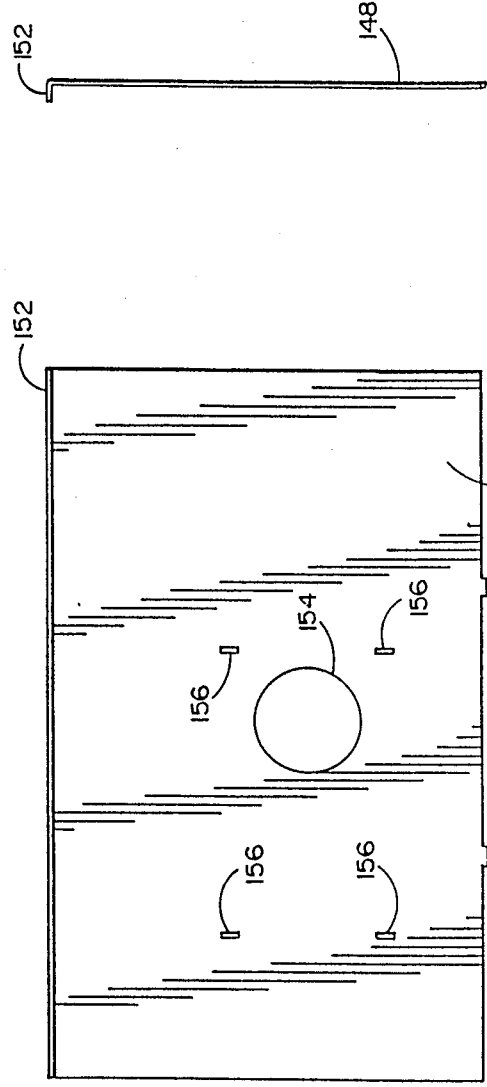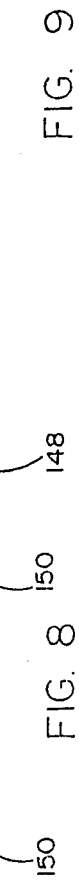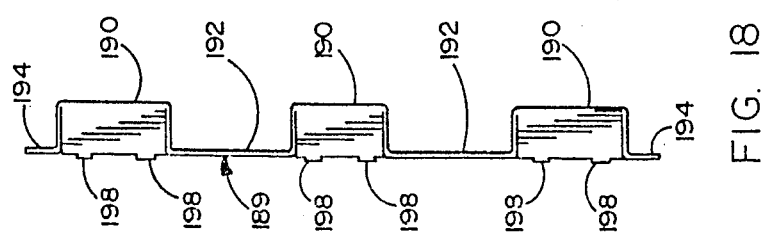

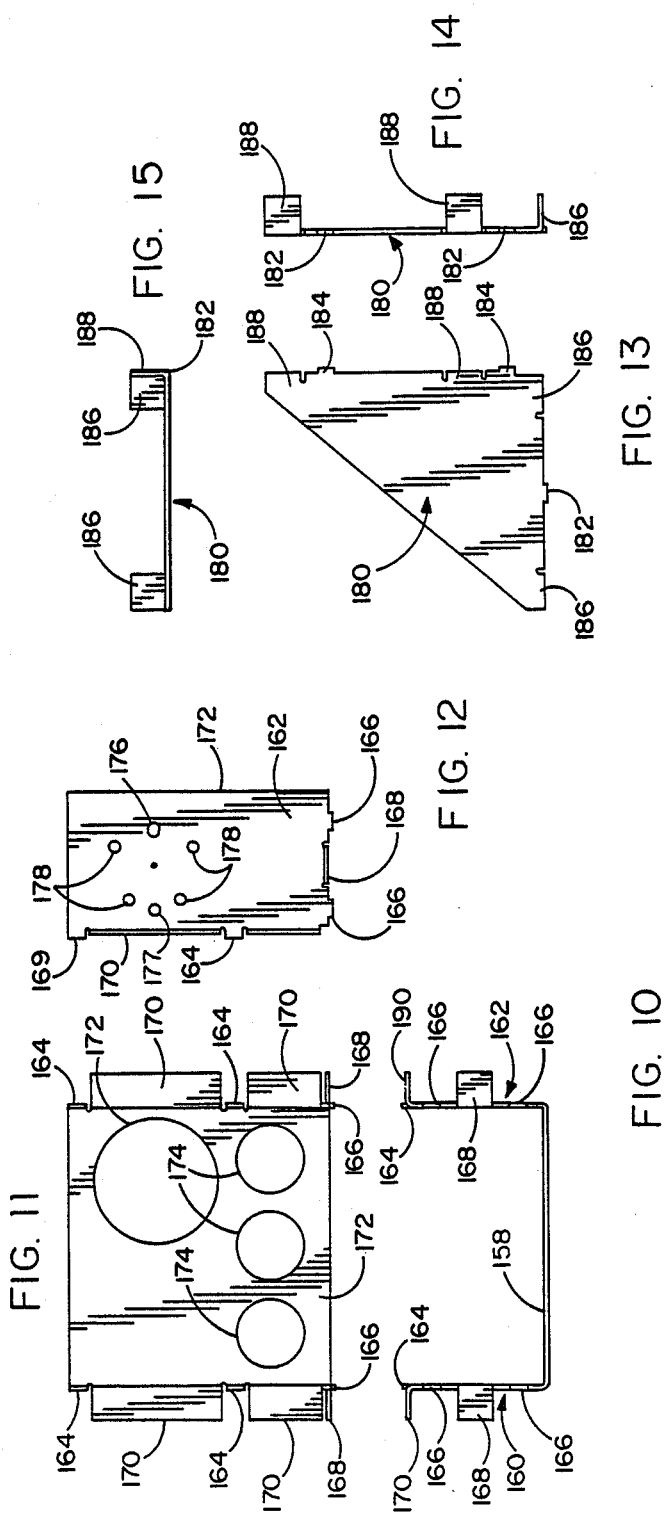

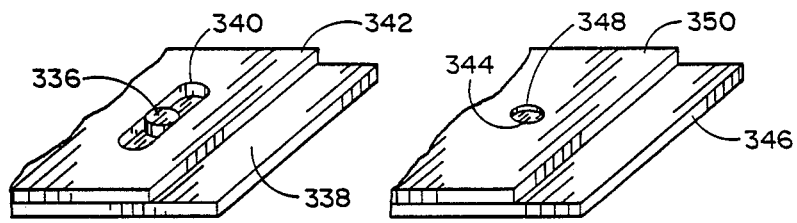
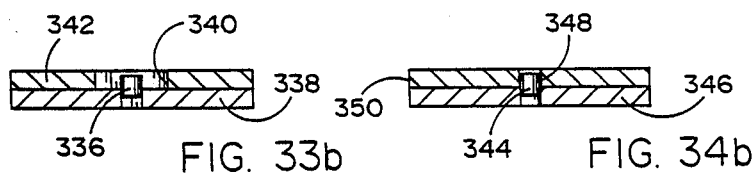
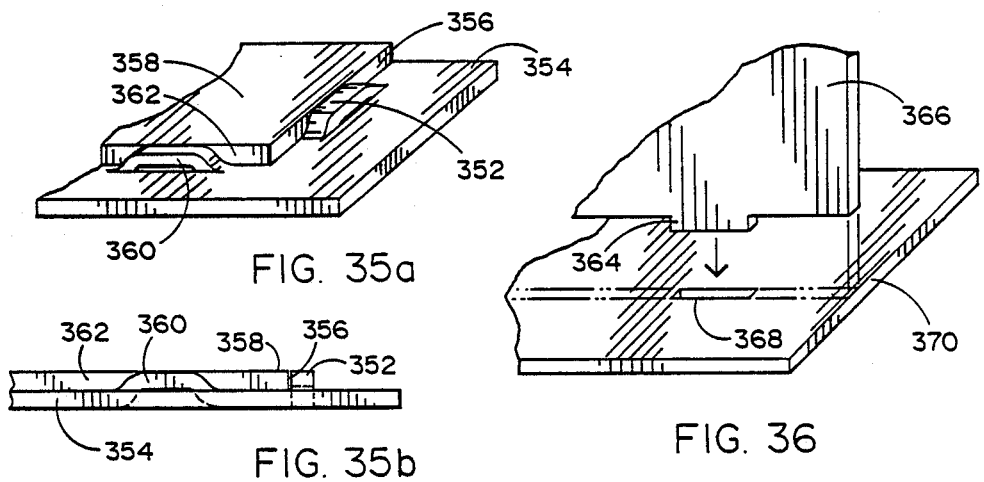
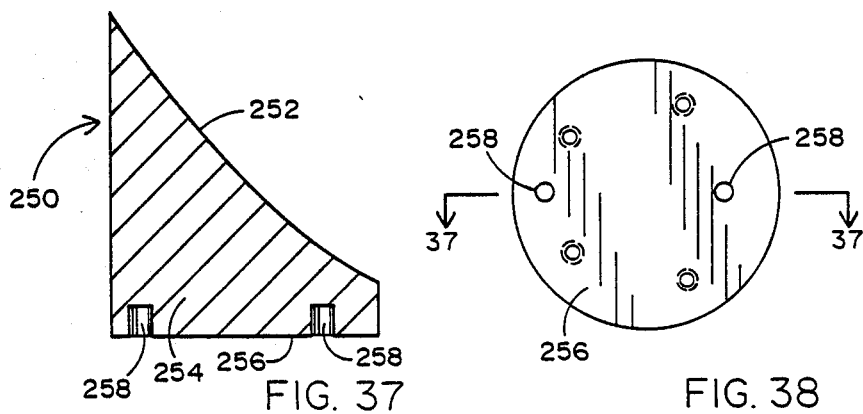

4,810,092

ECONOMICAL SPECTROMETER UNIT HAVING SIMPLIFIED STRUCTURE

This application is a continuation-in-part of Application Ser. No. 832,520, filed Feb. 21, 1986, and now abandoned.

BACKGROUND OF THE INVENTION

This invention relates to the spectrometry field, and specifically to spectrometers which incorporate interferometers. Its purpose is to provide a spectrometer arrangement which utilizes important developments in manufacturing techniques to simplify spectrometer fabrication and eliminate parts, while maintaining a high level of spectrometer performance.

The spectrometer systems heretofore supplied for laboratory and manufacturing environments have generally used thick aluminum base plates, which are drilled to provide mounting holes for the mirror mounts. The mirror mounts are complex assemblies, using springs, screws, and the like, to permit adjustment of the mirror positions. The overall costs of parts fabrication, assembling, and adjusting tend to result in relatively expensive structures.

One of the aspects of interferometer spectrometer systems which has not been fully utilized in structural design is the difference in accuracy requirements between the interferometer portion of the spectrometer system, and the remaining portions of the spectrometer system. Within the interferometer the precision required is orders of magnitude greater than that required in the portions of the spectrometer external to the interferometer. This, in part, is the basis for the present bold restructuring of the spectrometer.

A pervasive defficiency in the designing of interferometer spectrometer systems has been the failure to perceive the relevance and usefulness of modern manufacturing techniques, particularly those emanating from the revolutionary results of computer numerical control systems, in such fields as precision stamping of metal support members, and precision forming of curved mirror surfaces.

SUMMARY OF THE INVENTION

The present invention represents the first time in this field that a structure having close three-dimensional tolerances has been successfully built using essentially two-dimensional manufacturing techniques for precise positioning. All spectrometers have a cover. Until the present invention, it was used to exclude dust, or atmospheric gases if the system was purged. This cover is usually sheet metal. The inventive leap for the present application was the realization that the sheet metal cover could be, in effect, extended to provide the entire structure.

The present invention, in addition to making use of modern sheet metal manufacturing technologies to radically reduce the manufacturing costs, further simplifies spectrometer fabrication by making it possible to eliminate mirror position adjustments.

Manufacturing of the supporting elements (base, mirror mounts, etc.) is accomplished by computer-controlled stamping, or punching, machines; i.e., press-formed sheet metal parts are substituted for the supporting elements in the prior art structures.

Location of the mirror mounts, and other parts, with respect to the base is accomplished during the stamping process by forming integral shapes providing mating elements which can be held to very close tolerances, e.g., half-shear and hole combinations, tab and slot combinations, and hole and pin combinations.

The mirrors are formed by an accurately repeatable process, and are located by the close-tolerance fit of the stamped mating elements. Proper location of the mirrors is assured by using the same positioning structures both during their manufacture and, subsequently, in locating them in the spectrometer assembly. Therefore, no adjustment devices are required for the mirrors, which are directly secured to the sheet metal parts. Initially the mirrors will be formed by a high-precision diamond turning process. Subsequently, for high volume, they may be formed as plastic molded optics.

BRIEF DESCRIPTION OF THE DRAWINGS

FIGS. 1-26 are all views of a complete spectrometer structure, and its components, illustrating the present invention. The remaining figures illustrate either the application of the invention to different spectral analysis situations, or the details of the integrally-formed projections and recesses used for precise positioning of elements in the structures.

FIG. 1 is a plan view of the entire assembled spectrometer, showing some broken-away portions of the cover;

FIG. 2 is an elevation view showing one longitudinal side of the assembled spectrometer;

FIG. 3 is an elevation view showing the other longitudinal side of the assembled spectrometer;

FIGS. 4 and 5 are sectional views taken on the lines 4—4 and 5—5, respectively, of FIG. 1;

FIG. 6 is a plan view of the sheet metal chassis, which has been formed from a single sheet metal stamping;

FIGS. 7A and 7B are elevation views showing opposite longitudinal sides of the chassis shown in FIG. 6;

FIGS. 8 and 9 are front elevation and end views, respectively, of one of two end wall plates, each of which constitutes the fourth wall of either the interferometer section or the detector section;

FIGS. 10, 11 and 12 are bottom, rear elevation, and side elevation views, respectively, of one of the two (preferably identical) mirror-mounting brackets, each of which is formed as a sheet metal stamping, and is then secured to the chassis and to one of the wall plates;

FIGS. 13, 14, and 15 are side elevation, end, and top views, respectively, of a gusset used to rigidify one side wall of the interferometer section;

FIGS. 16, 17 and 18 are plan, longitudinal elevation, and end views, respectively, of the channeled supporting member which underlies the spectrometer floor;

FIGS. 19 and 20 are plan and end views, respectively, of a sheet metal supporting bracket for the interferometer;

FIGS. 21-23 show a sheet metal frame and cover plate used to cover the interferometer section;

FIGS. 24 and 25 are plan and longitudinal elevation views, respectively, of a chassis weldment assembly, which includes all the sheet metal parts after they have been welded to the chassis;

FIG. 26 is a cross-section taken on line 26—26 of FIG. 24;

FIGS. 33A and 33B are isometric and sectional views, respectively, of a half-shear pin and slot positioning structure;

FIGS. 34A and 34B are isometric and sectional views, respectively, of a half-shear pin and hole positioning structure;

FIGS. 35A and 35B are isometric and sectional views, respectively, of a lance (dimple) positioning structure;

FIG. 36 is an exploded isometric view of a slot and tab positioning structure; and FIGS. 37 and 38 are cross-sectional and back views, respectively, of a parabolic mirror having positioning recesses formed in its mounting surface.

DETAILED DESCRIPTION OF PREFERRED EMBODIMENT

Figure 1:
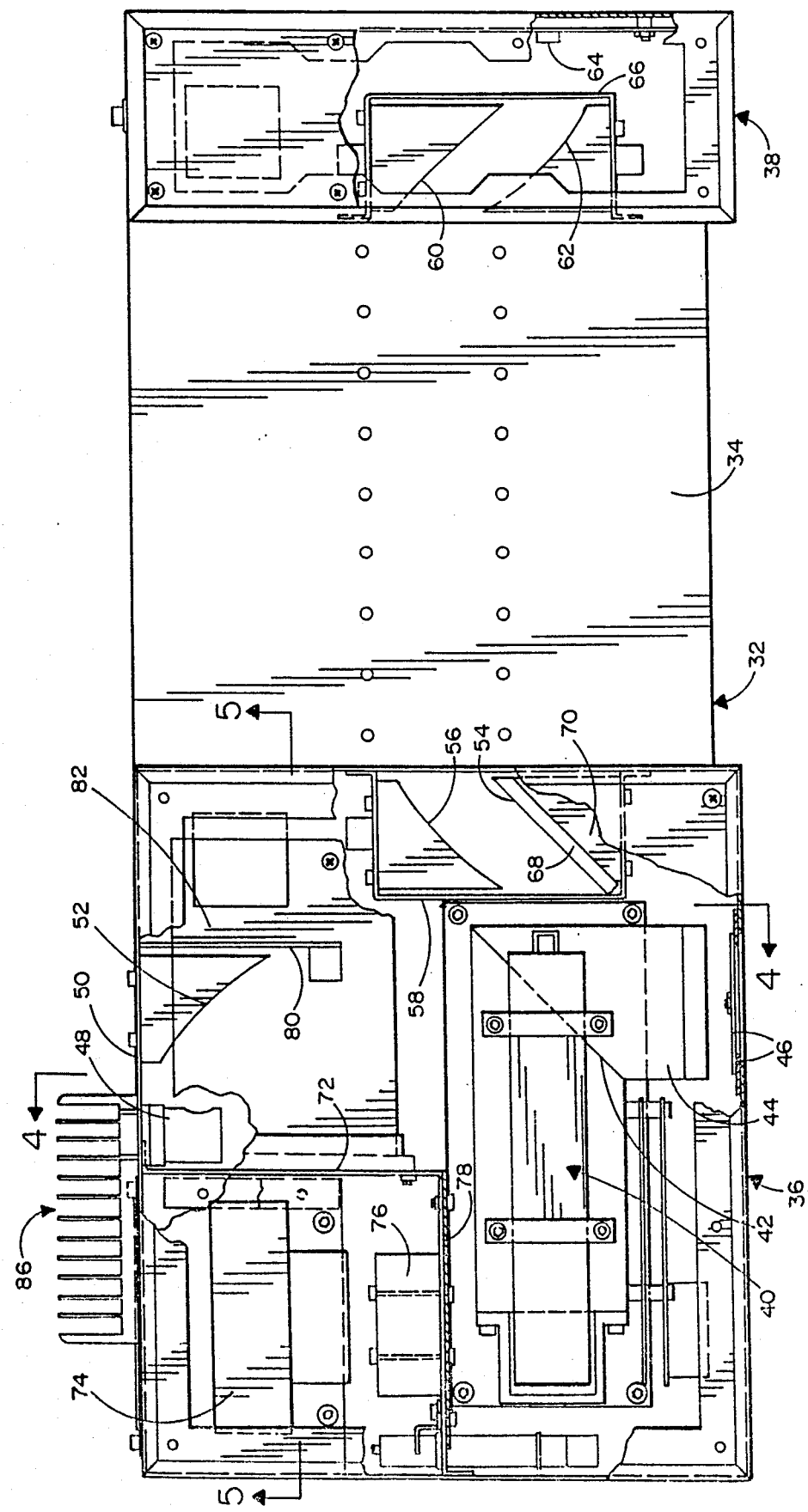
Figure 4:
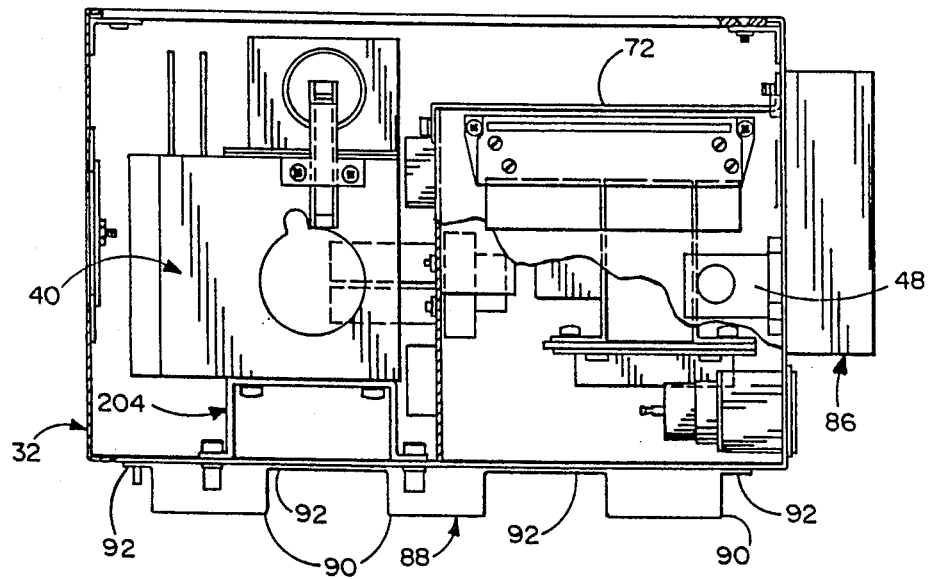
Figure 5:
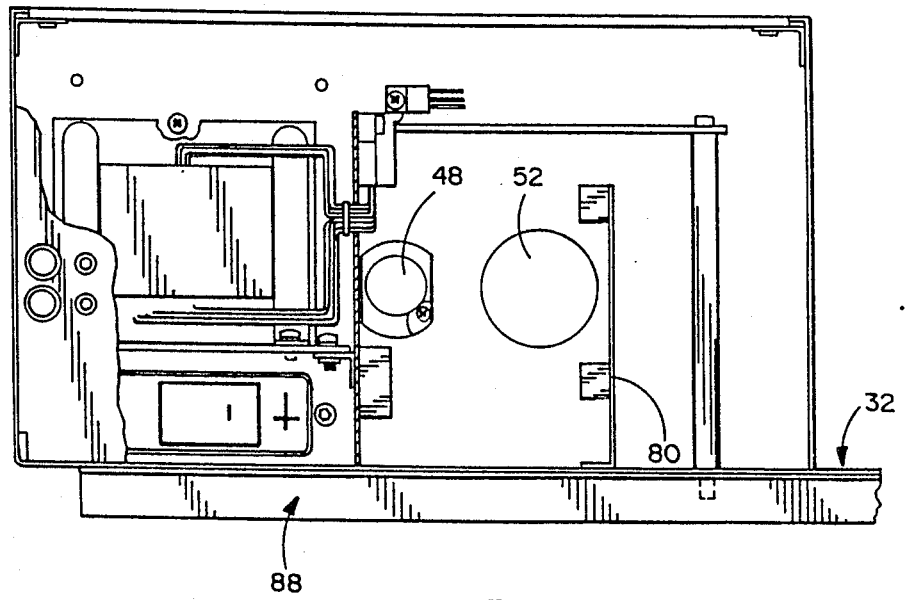

FIGS. 1-5 show a completed spectrometer structure. As best seen in FIG. 1, a unitary sheet metal chassis 32 is provided, which has an open sample area 34 between an enclosed interferometer section 36 and an enclosed detector section 38. The covers of the interferometer and detector sections have been generally broken away in FIG. 1 to display the internal units.

An interferometer 40 is supported on chassis 32. This interferometer may correspond to the one disclosed in U.S. application Ser. No. 789,849, filed Oct. 21, 1985, and assigned to the assignee of this application. The interferometer has its beamsplitter at 42, its movable mirror arranged o reciprocate along a left-to-right path (as seen in FIG. 1), and its fixed mirror located in lateral arm 44. Access to the adjusting mechanism used for initial position-adjustment of the fixed mirror is permitted by removal of an access cover 46.

A radiation source 48 is secured directly to side wall 50 of the interferometer section. Also secured directly to side wall 50, without any adjusting mechanism, is a paraboloid mirror 52, which receives radiation from source 48, and directs a collimated beam toward the beamsplitter in interferometer 40.

The collimated beam leaving interferometer 40 is reflected by a flat mirror 54 toward a paraboloid mirror 56. Both flat mirror 54 and paraboloid mirror 56 are supported on opposite side walls of a mirror-support bracket 58, having a substantially channel-shaped horizontal cross-section.

The radiation reflected from paraboloid 56 has its focal point at the center of the sample area. Post-sample radiation is recollimated by a paraboloid mirror 60, which directs a collimated beam toward a paraboloid mirror 62. Radiation leaving paraboloid 62 is directed to a detector 64. The two paraboloids 60 and 62 are supported on opposite side walls of a mirror-support bracket 66, which preferably is identical to bracket 58, for manufacturing economy.

Each of the mirrors 56, 60 and 62 is secured directly to the bracket wall, without any adjusting mechanism. Flat mirror 54 also is non-adjustable. It is shown as a glass mirror 68 glued to an aluminum wedge-shaped block 70, which is directly secured to the bracket wall.

The two paraboloid mirrors 56 and 60 have relatively long focal lengths, and are identical. The two paraboloid mirrors 52 and 62 have relatively short focal lengths, and are identical.

The absence of adjustments for the mirrors (except the mirror inside the interferometer) provides a very significant cost reduction. This elimination of mirror adjustments is permitted in part by the use of a highly repeatable and precise mirror-forming method, and in part by precise, low tolerance location of the mirror-supporting walls. Additionally, as stated above, the elimination of mirror adjustments takes advantage of the very much lower precision requirements outside the interferometer than inside it.

One of the primary reasons for the accuracy of mirror positioning in the spectrometer assembly is illustrated in FIGS. 37 and 38. As shown in those figures, a mirror, indicated by numeral 250, has a non-flat (usually parabolic) reflecting surface 252. The mirror is integral with its supporting body portion 254, which has a flat rear mounting surface 256 adapted to engage, and be secured to, a suitable sheet metal supporting element in the spectrometer structure.

A plurality of holes, or recesses, 258 are formed in the mounting surface 258 of the mirror body, for the purpose of receiving matching dowel pins, which precisely locate the mirror. The locating pin and recess combinations are used during the process of forming the mirror surface 252 (as by turning in a computer controlled lathe). When the spectrometer is assembled, the same pin and recess combinations provide precise location for the mirror body with respect to its sheet metal supporting element. This use of the same locating features during mirror surface formation, and in the final assembly, is a major factor in permitting mirror-adjusting components to be omitted from the spectrometer. In other words, the optical element (mirror) is located relative to the optical bench (spectrometer) by features machined into the mirror itself. The clearance of the pins in the recesses can be held as low as 0.001 inch.

If molded plastic mirrors (or other optics) are used, a member having the same structure as mirror body 254 (or another optical element) is used as the insert, around which the mold is formed. The same dual function of positioning means exists in the mirror forming phase and in the spectrometer assembling phase.

Detector 64 (FIG. 1) is secured directly to a side wall of the spectrometer. It may be desirable to allow adjustability of the detector position.

An enclosed compartment 72 houses a transformer 74 and a laser power supply 76. This full enclosure, which includes its own cover, avoids shock risk and isolates the noise from the sensitive portions of the spectrometer. An access cover 78 is secured to one side wall of compartment 72. This assembly adds rigidity to the side wall near the radiation source 48 and mirror 52.

A strengthening gusset 80 is secured to the floor 82 of the chassis and to its side wall 50, in order to provide additional rigidity for the side wall near radiation source 48 and mirror 52. Mounting of source 48 on the side wall, which is metallic, permits escape of heat through the wall and through a finned heat sink 86.

As seen in FIGS. 2-5, the chassis 32 rests on, and is welded to, a unitary chassis support member 88, which is a sheet metal stamping having three longitudinal channel-shaped runners 90 (see cross-section in FIG. 4), and four flanges 92 welded to the bottom of the chassis.

One of the major advantages of the present invention is the use of sheet metal parts. This permits substantial reduction of cost, while maintaining high performance capability. Modern computer-aided manufacturing (CAM) systems are available for sheet metal stamping (punching) processes. The position locations which require precision can be controlled to tolerances closer than 0.010 in., which is adequate for good spectrometer performance. Most of the precision locations are determined by slots, tabs, half-shears, and holes formed in the sheet metal chassis as part of the press-forming (punching) sequence. Another advantage of CAM is the ease with which design changes may be made, as experience dictates their desirability.

The sheet metal chassis eliminates the former thick aluminum base plate, e.g., one-half inch thick, and eliminates all casting, machining, drilling and tapping processes. Although the initial prototypes used sheet metal steel, subsequent structures have used aluminum sheet metal, which has certain advantages over steel.

Figure 6:
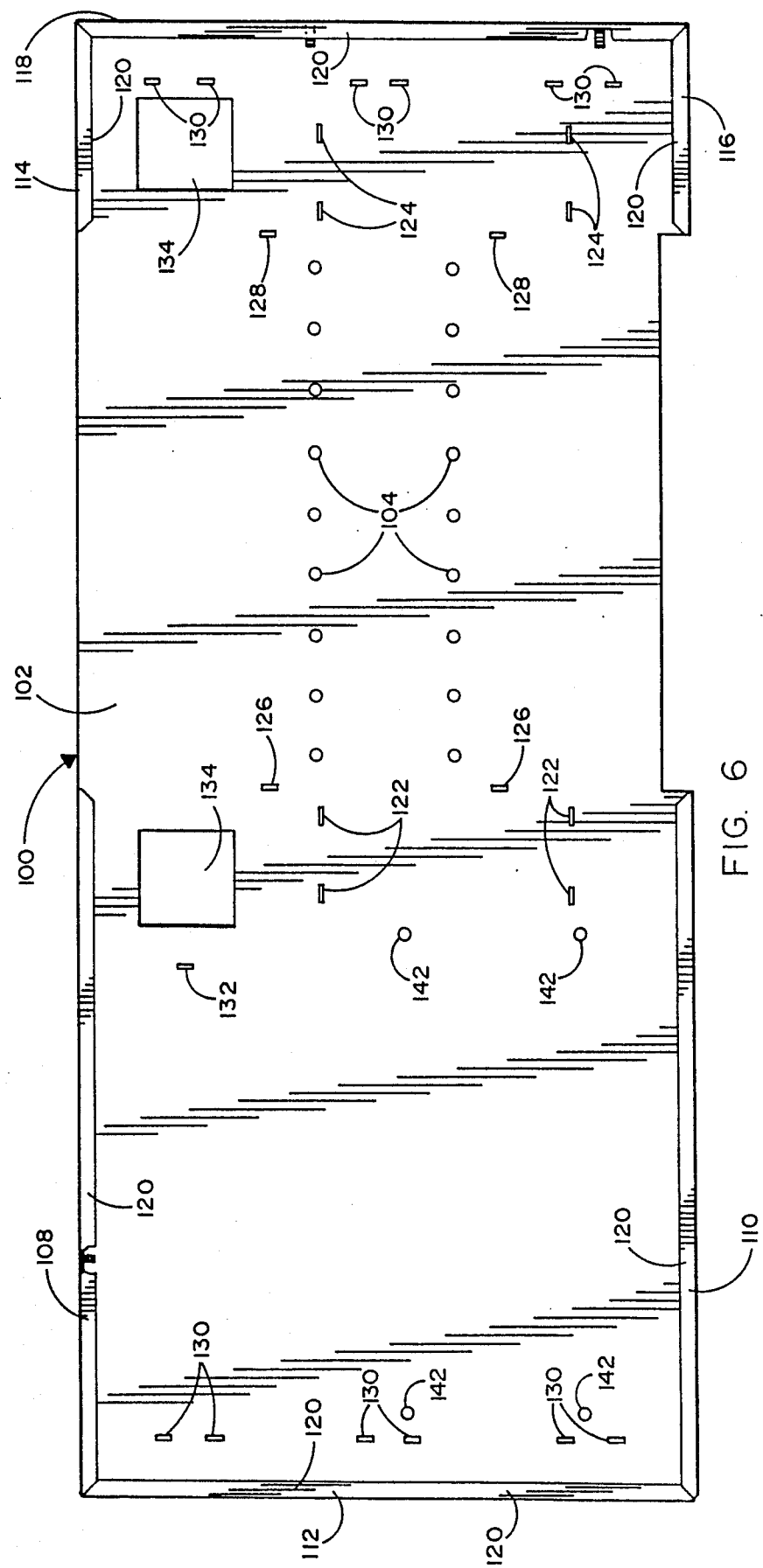

FIGS. 6, 7A and 7B show the sheet metal chassis, which was first punched out of sheet metal stock, as an integral element having a floor section, extensions which will form three side walls of the interferometer section, and extensions which will form three side walls of the detector section. A large number of rectangular slots and holes have been cut in the sheet metal, whose positions have been held to close tolerances, in order to determine accurate locations for the mirror-mounting structures and other units in the spectrometer. (New numerals will be applied in describing the element-by-element sheet metal forming processes, and the welding and other means used to secure the elements together).

The entire chassis stamping is indicated by the numeral 100. The flat floor 102 of the sample area has a plurality of holes 104 formed therein. These holes provide various locations for temporary mounting of whatever sample holding accessory is being used. The holes are adapted to receive PEM fasteners, some of which (106) are shown in place in FIG. 7A. An advantage of PEM fasteners is that their insertion creates some metal flow, which ensures tight and accurately located fastener connections.

The two walls 108 and 110, and the end wall 112, of the interferometer section have been bent upwardly from the sheet metal floor to extend perpendicularly to the floor. The two walls 114 and 116, and the end wall 118, of the detector section have also been bent upwardly from the sheet metal floor to extend perpendicularly to the floor. Additionally, each of the six vertical walls 108 through 118 has an integral narrow horizontal flange 120 turned inwardly at its upper end. These flanges have 45° edges which abut one another as shown.

Four rectangular slots 122 are formed in the floor of the interferometer section to locate one mirror-mounting bracket; and four rectangular slots 124 are formed in the floor of the detector section to locate the other mirror-mounting bracket. Both the interferometer section and the detector section require a fourth vertical wall, each of which is a separately formed stamping. Two slots 126 are provided to locate the fourth wall of the interferometer section; and two slots 128 are provided to locate the fourth wall of the detector section.

Near each end of the chassis, a group of six laterally spaced slots 130 are shown. These slots receive integral tabs formed as integral projections of the multi-channel sheet metal support which underlies the floor of the chassis. Also, a slot 132 is used to locate the gusset which is secured to the floor of the interferometer section and to wall 108. Two rectangular holes 134, one in the interferometer section, and one in the detector section, are used to admit interconnecting electrical cables to those sections, the cables conveniently extending inside one of the channels formed in the support element underneath the chassis. The same holes and channel are used to conduct nitrogen gas into the spectrometer, for purging purposes.

FIG. 7A shows round holes 136 in the wall 108, which are used to locate members which secure the radiation source to wall 108. The pre-interferometer paraboloid mirror is positioned with respect to wall 108 by means of one round hole 139, and one oblong hole 140, in the wall, through which dowel pins (not shown) are inserted into round openings in the base of the mirror body. Four additional round holes 138 in wall 108 are used to locate members which secure the mirror body to wall 108. As previously stated, both the radiation source and the adjacent paraboloid are secured directly to wall 108.

Holes 142 in the floor of the interferometer section combine with PEM fasteners to secure the interferometer-supporting element. The fully enclosed chamber containing the transformer and laser generator is defined in part by the locations of slots 144 in wall 108. Slots 146 in wall 108 receive tabs on the wall-rigidifying gusset.

FIGS. 8 and 9 show a sheet metal plate 148 which provides the fourth wall for either the interferometer section or the detector section. The two such walls are mirror images of one another. The lower edge of each wall has two tabs 150 which tightly fit into and are therefore located by, either the two slots 126, or the two slots 128, in the chassis floor (FIG. 6). The upper edge of wall 148 is bent over to form a narrow flange 152, the edges of which engage the upper flanges on the two adjacent side walls of the chassis. A hole 154 through wall 148 allows radiation to pass through. On the interferometer side, the radiation is coming from a paraboloid mirror; and on the detector side, the radiation is going toward a paraboloid mirror. Four slots 156 are provided in wall 148, in order to receive tabs formed on the adjacent mirror-mounting bracket.

FIGS. 10–12 show one of the two mirror-mounting brackets, which are preferably identically formed, for manufacturing economy. Bracket 158 is a sheet metal stamping having an essentially channel-shaped horizontal cross-section, as shown in the bottom view (FIG. 10). The side walls 160 and 162 each have two tabs 164 which fit into slots 156 in wall element 148 (FIG. 8). The side walls 160 and 162 also each have two tabs 166 which fit into slots in the floor of the chassis (FIG. 6). The four tabs 166 of one bracket 158 fit into slots 122 in the interferometer section. The four tabs 166 of the other bracket 158 fit into slots 124 in the detector section.

The brackets 158 are each welded both to the floor of the chassis and to the respective fourth vertical wall 148. Two integral, horizontally-extending flanges 168, one bent outwardly from the bottom of side wall 160, and one bent outwardly from the bottom of side wall 162, are welded to the chassis floor. Each side wall has two integral, vertically-extending flanges 170, which are welded to vertical wall 148.

As previously explained, mirrors are supported on each of side walls 160 and 162 of the bracket. Its third wall 172 has a plurality of openings, as seen in FIG. 11. A large opening 172 is the one through which radiation passes, either entering or leaving the sample area. Three other openings 174 are access openings through which the mirrors can be reached during the process of mounting them on the side walls. As seen in FIG. 12, a plurality of slots and holes are provided in each side wall for use in mounting and securing a mirror. An oblong slot 176 and a round slot 177 are arranged to receive closely-fitting dowel pins, which also enter openings in the rear of the mirror structure. These pins and slots provide close tolerance location of each mirror. Four other holes 178 receive fasteners which clamp the mirror structure to the bracket side wall.

FIGS. 13–15 show a sheet metal gusset 180, which stiffens, and guarantees perpendicularity of, that side wall of the interferometer section on which are mounted the radiation source and one of the paraboloid mirrors. Gusset 180 has one downwardly-projecting tab 182 which fits into slot 132 in the floor of the chassis (FIG. 6), and two laterally-projecting tabs 184 which fit into slots 146 in the side wall of the interferometer section (FIG. 7). Two horizontally-extending integral flanges 186 are welded to the chassis floor; and two vertically-extending integral flanges 188 are welded to the side wall.

Figures 16, 17:
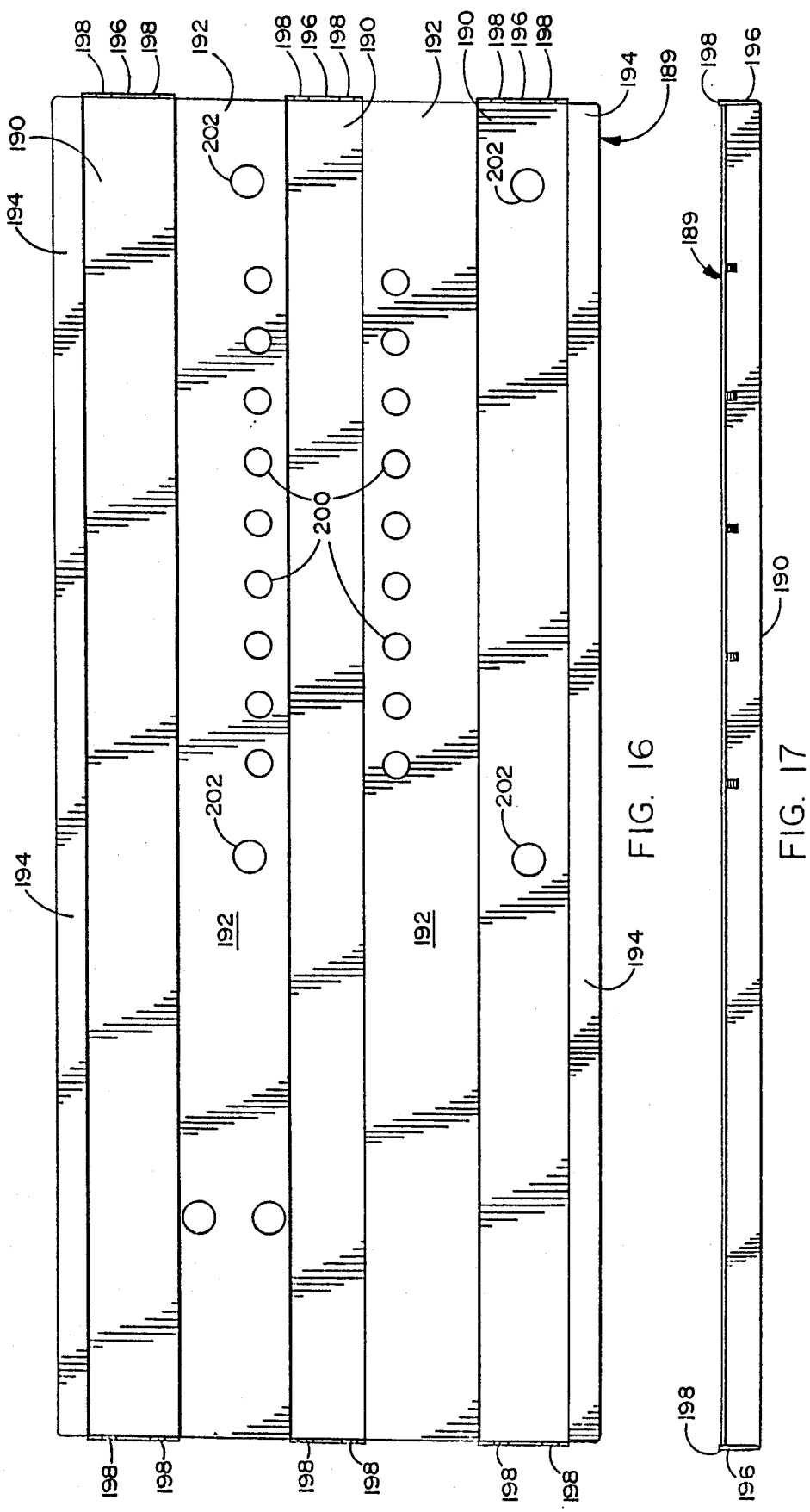

FIGS. 16–18 show a sheet metal chassis-supporting element 189. It is formed with three longitudinally-extending channels having bottom surfaces 190 which rest on a working table, or the like. Between the channels are two flat longitudinally-extending integral strips 192 which are spot welded to the bottom of the chassis floor. Also two longitudinally-extending side flanges 194 are spot welded to the bottom of the chassis.

As seen in FIG. 17, the sheet metal support has upwardly-bent end walls 196 at each end of each channel. These end walls (six in all) enclose the channels, and each of them has two upwardly-projecting tabs 198 which fit into slots 130 in the floor of the chassis (FIG. 6). A plurality of spaced holes 200, in two rows, which are fitted with PEM nuts, are provided for the user's convenience in locating a sample-containing unit in the sample area. Several other holes 202 permit access for spot welding.

FIGS. 19 and 20 show a sheet metal bracket 204, on which the interferometer is mounted. The upper surface 206 of bracket 204 supports the interferometer, and has a plurality of holes 208 to receive fasteners securing the interferometer to the bracket. Two outwardly-extending integral flanges 210 on opposite sides of the bracket are secured to the chassis floor by fasteners extending through holes 212.

Figures 21, 22:
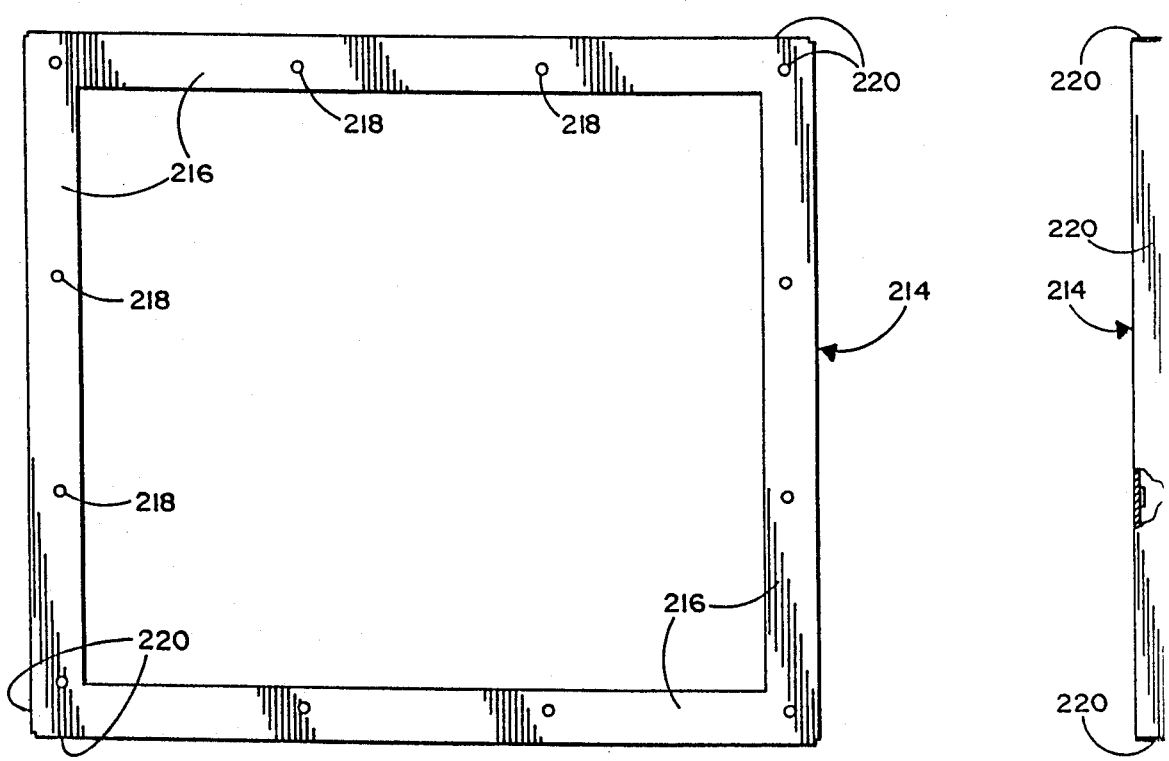
Figure 23:
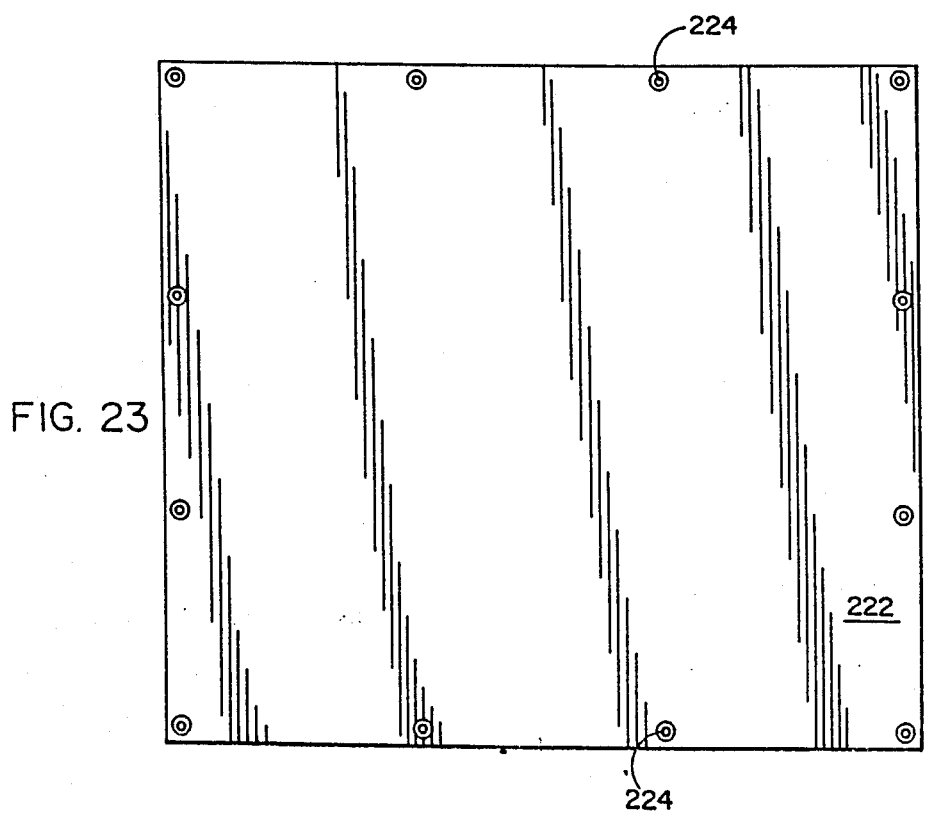

The interferometer and detector sections each have covers. In order to simplify cover attachment, two sheet metal parts are used to cover each section, a frame and a cover plate. FIGS. 21–23 show these two sheet metal elements for the interferometer section. A similar arrangement is used to cover the detector section.

A frame 214 is shown in FIGS. 21 and 22. It has a rectangular shape, as seen in FIG. 21, which is open at the center. Four flat integral frame sides 216 provide openings 218 for cover-securing fasteners. Each of the four frame sides 216 (which are L-shaped in cross-section) has an integral right-angle downwardly-extending flange 220 which engages one of the walls of the interferometer section. The frame 214 is located just under, and in engagement with, the narrow flanges 120 (FIG. 6) and 152 (FIG. 9) which are turned inwardly from the upper ends of the interferometer section walls. The frame 214 is spot welded to the section walls and flanges.

A flat sheet metal cover 222 is shown in FIG. 23. It is placed on the frame 214, and is secured thereto by fasteners extending through countersink holes 224 into openings 218.

Figure 24:
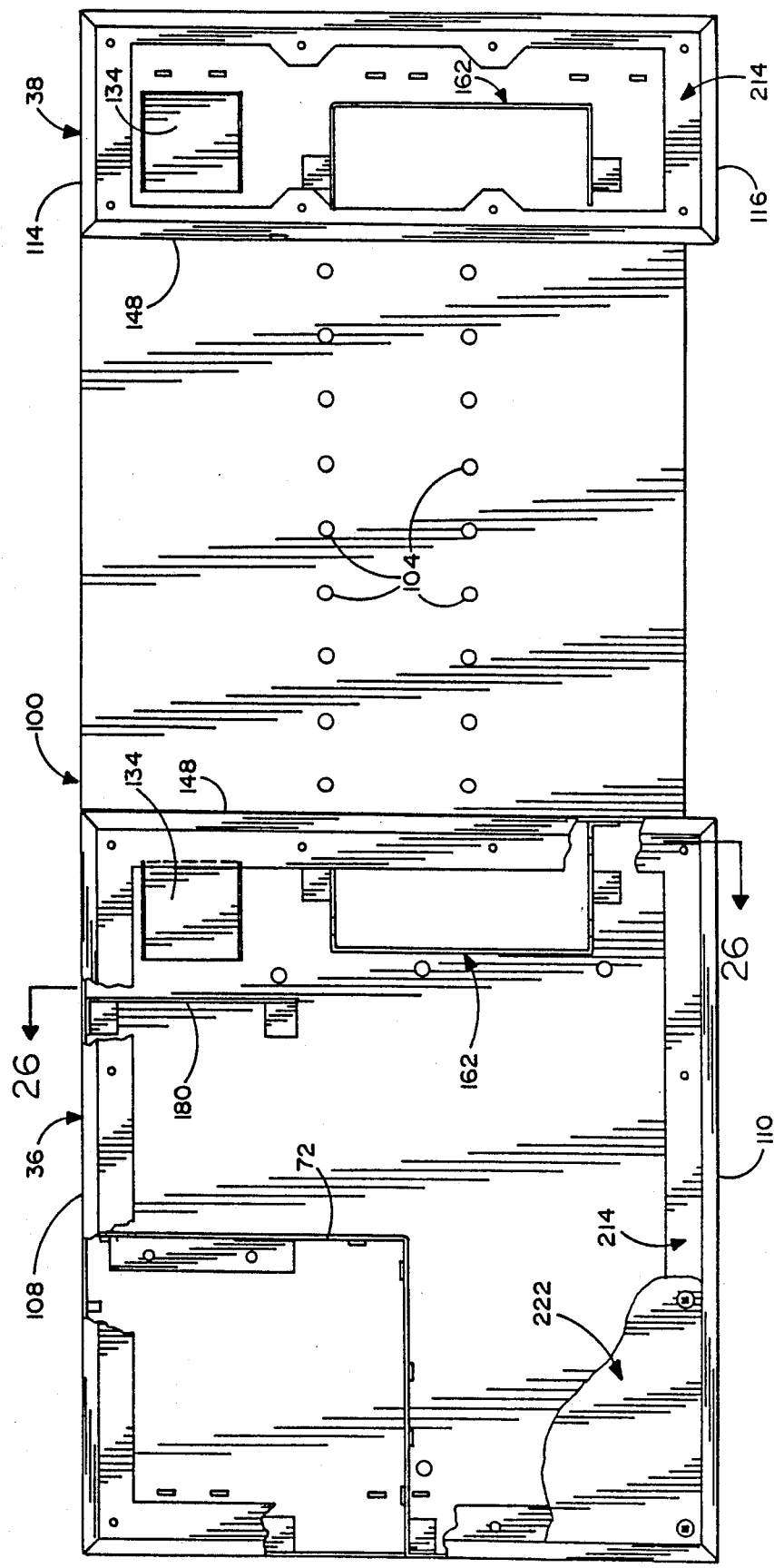
Figure 25:
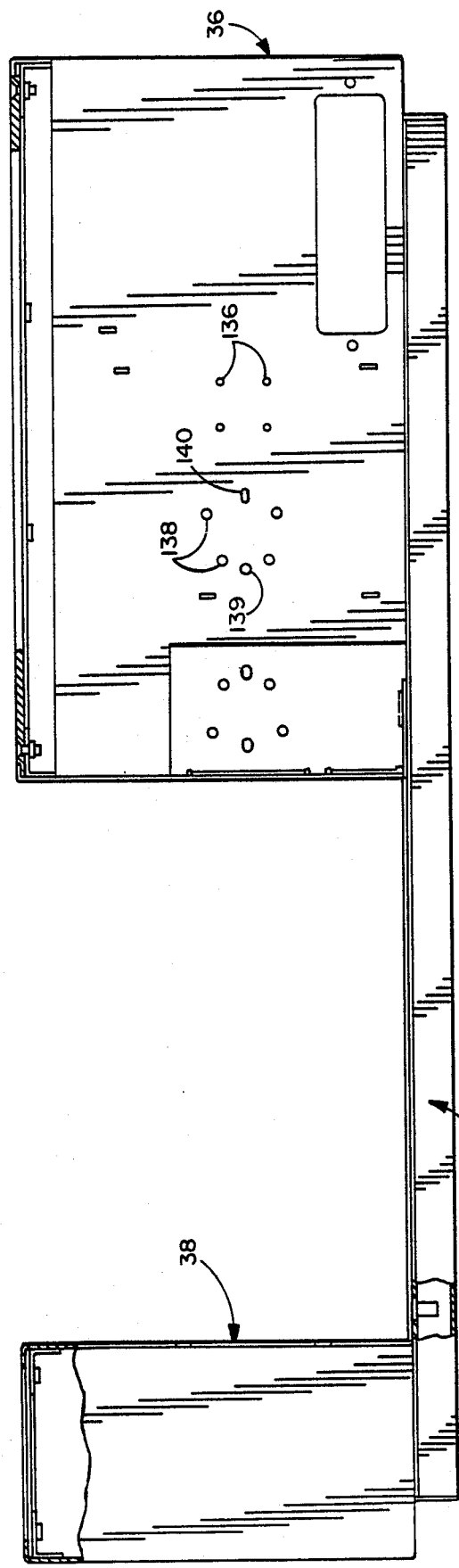
Figure 26:
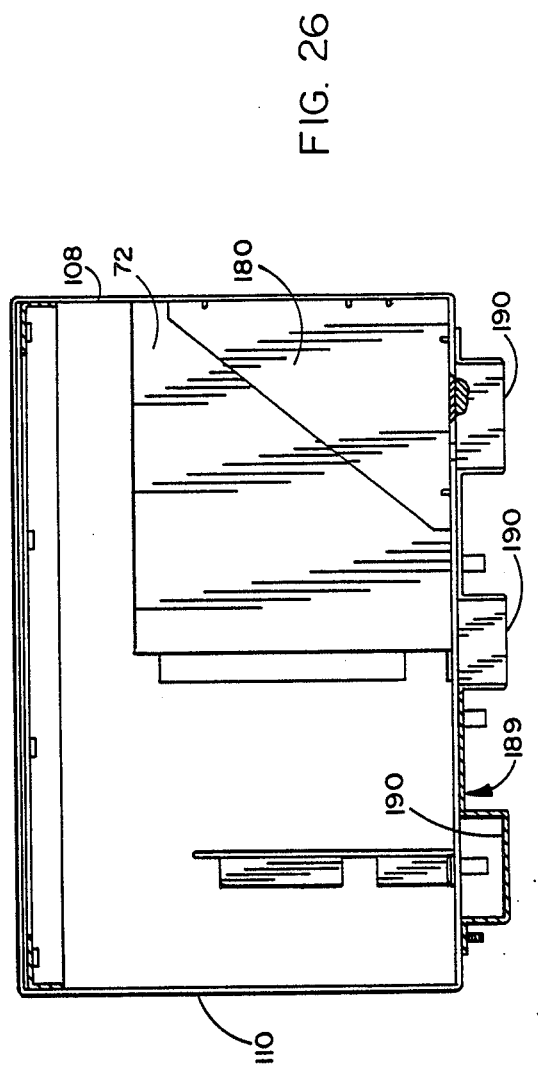
Figure 27:
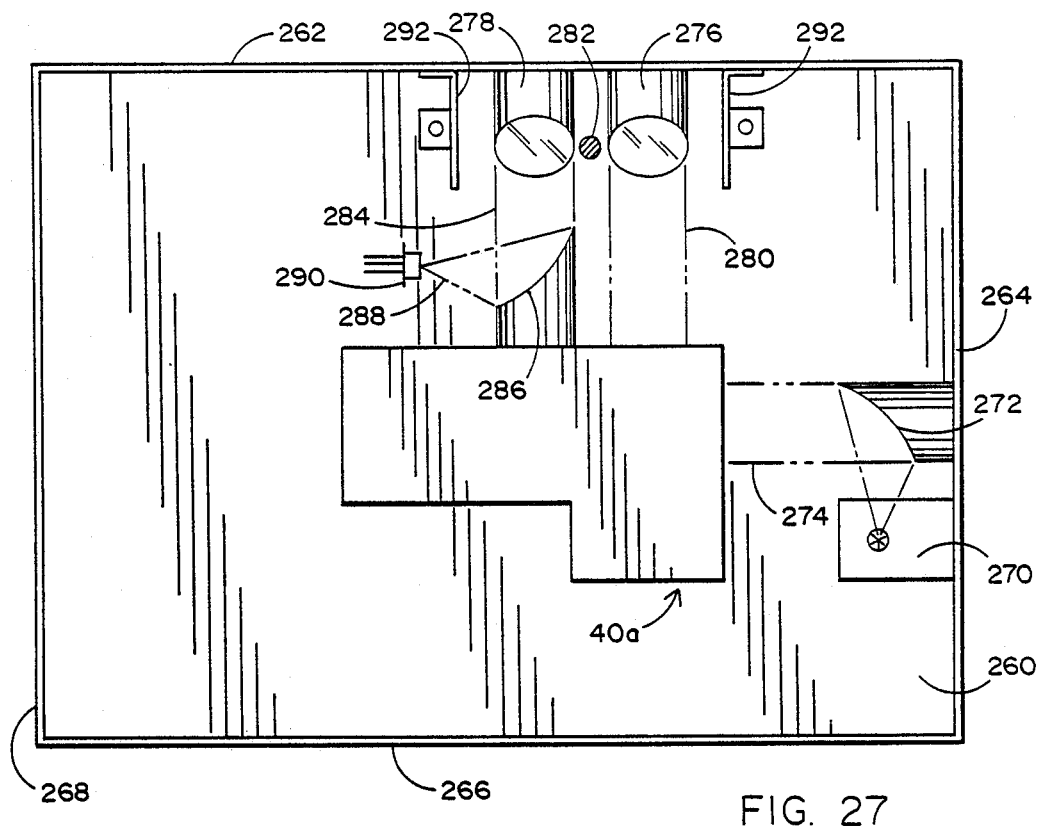
FIG. 27 is a plan view of another embodiment of the invention, in which the sample is in a reflectance mode, and is spaced vertically from the optical elements.

FIGS. 24–26 are plan, longitudinal elevation, and end elevation views, respectively, of the chassis weldment assembly, i.e., the sub-assembly which results when all of the sheet metal stampings have been welded to the sheet metal chassis. The parts have been located to close tolerances by the slot and tab, or half-shear, alignment technique. The numerals applied in FIGS. 24–26 are the same as those used in identifying the sheet metal stampings in FIGS. 6–23.

FIGS. 27–30 show an optical arrangement for reflection spectroscopy, in which the concepts of the present invention are incorporated. A supporting platform 260 is formed by sheet metal presses; and four side walls 262, 264, 266 and 268 are preferably formed integrally with the sheet metal platform. The four walls may be bent during the metal-forming process to extend upwardly, providing the structural enclosure (except for the cover).

An enclosed interferometer unit 40a is mounted on the floor, or platform, 260. Mounted on side wall 264 are a radiation source 270 and a short focal length parabolic mirror 272, which causes a collimated beam 274 to enter the interferometer unit. Mounted on side wall 262 are two longer focal length parabolic mirrors 276 and 278. Mirror 276 receives a collimated beam 280 which exits from the interferometer unit, and focuses that beam at a sample 282, which is located above the mirror. (The sample may or may not be located within the spectrometer enclosure). Radiation returning from sample 282 is received by parabolic mirror 278, and recollimated to provide beam 284. A short focal length parabolic mirror 286 directs a focusing beam 288 to a detector 290.

Figure 28:
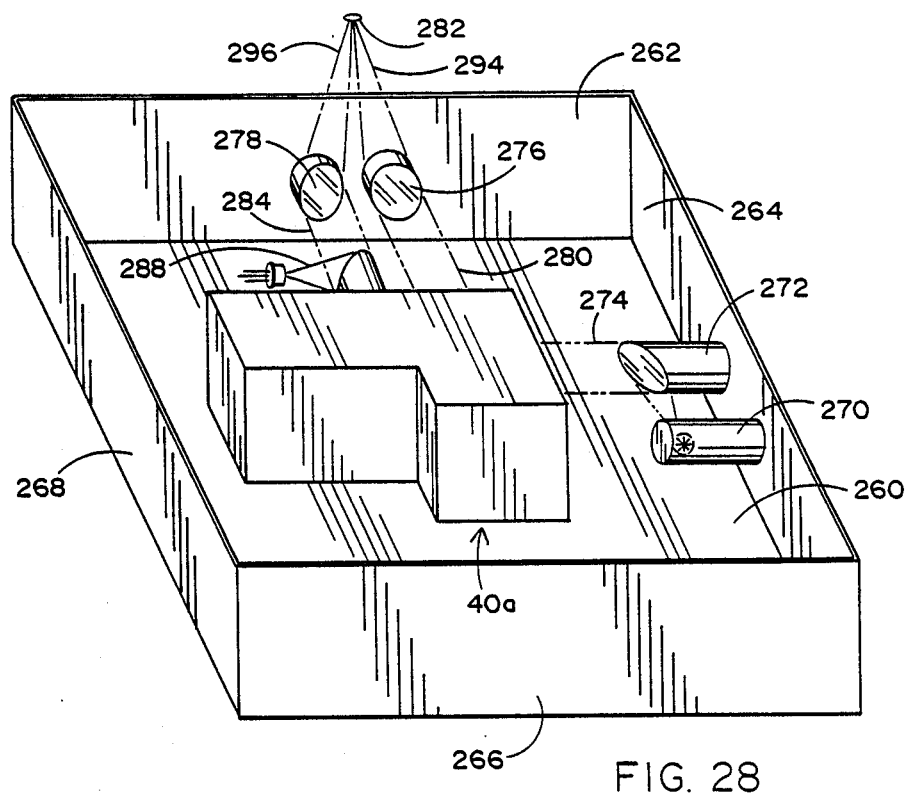
FIGS. 28 and 29 are isometric views of the structure of FIG. 27, taken from different vantage points.

Because wall 262 is the mounting surface for two parabolic mirrors, it will probably be desirable to provide gussets 292 for floor to wall bracing (not shown in FIG. 28). Similar gussets might also be desired for wall 264.

FIG. 28 provides a clearer showing of the location of the sample, and of the orientation of the mirrors and their incident and reflected beams. Mirror 276 directs a focusing beam 294 toward sample 282; and mirror 278 receives radiation 296 returning from the sample.

Figure 29:
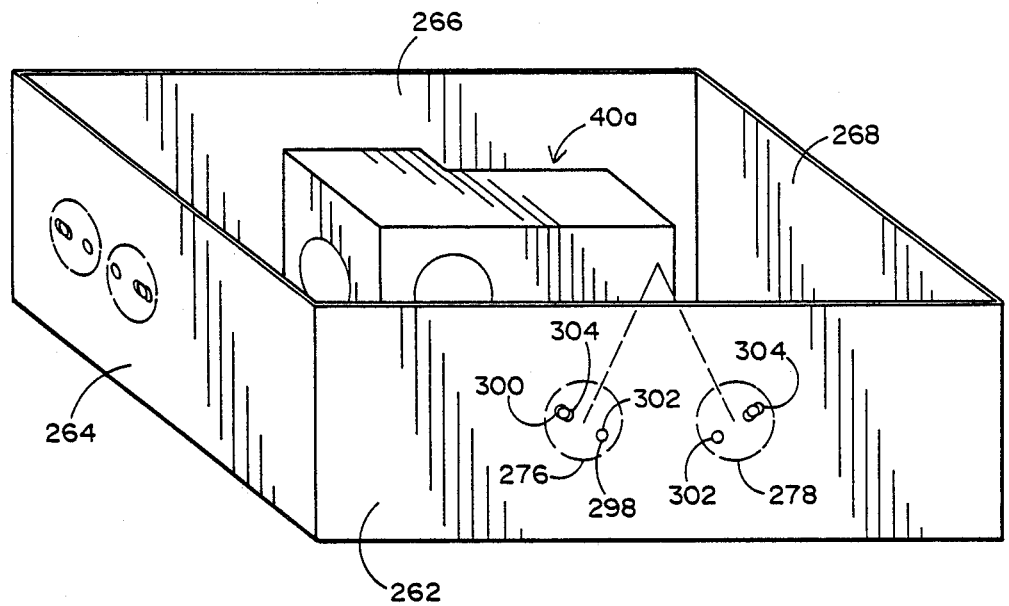
Figure 30:
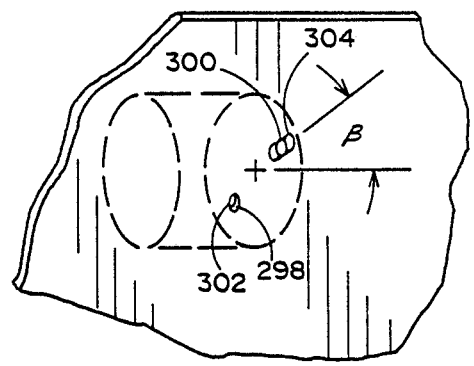
FIG. 30 is a closeup of a detail of FIG. 29.

FIGS. 29 and 30 show details of the structures which precisely locate mirrors 276 and 278 in their mounted positions on wall 262. In this illustration locating of each mirror is accomplished by using two dowel pins 298 and 300 which fit into two round holes in the mirror body (not shown). A round hole 302 in wall 262, and a slot 304 in wall 262 also engage the dowel pins 300 and 302. The purposes of the slot 304 are to accommodate differential thermal expansion (mirror v. wall), and to permit less precise manufacturing tolerances. The pin 298 in hole 302 provides the mirror locating point; and the pin 300 in slot 304 prevents rotational movement of the mirror.

Figure 31:
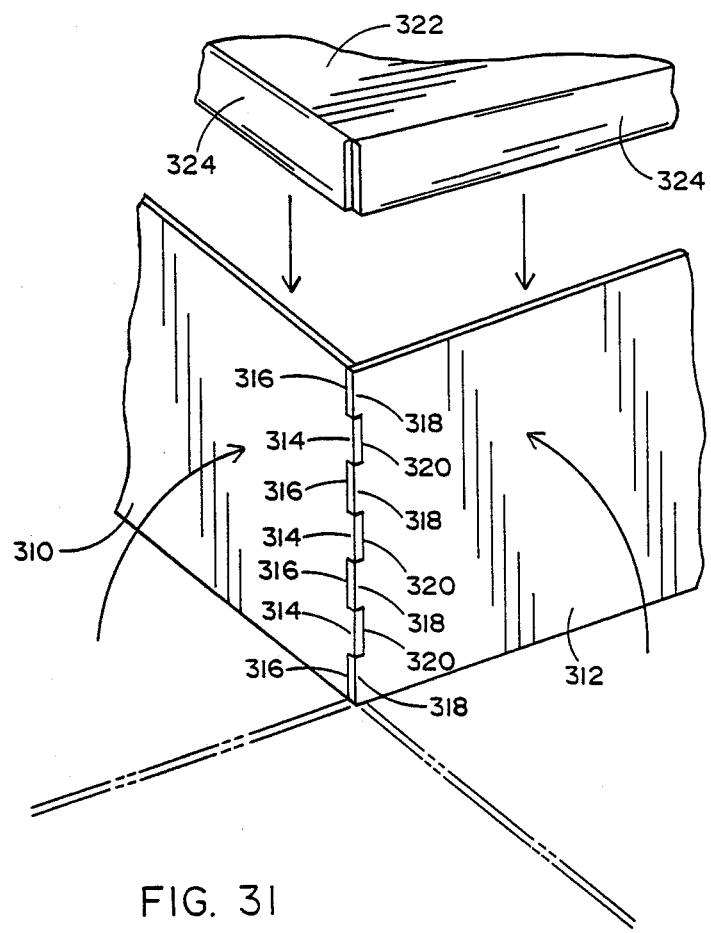
FIG. 31 is an exploded isometric showing details of a floor/wall corner construction useful in any of the embodiments.

FIG. 31 shows details of a possible corner formed by two walls 310 and 12. The precise perpendicular positioning of each wall is guaranteed by its engagement with the other wall. Tab and recess combinations (sets) are used; usually a plurality of sets is desired. Wall 310 shows three tabs 314 and four recesses 316. Wall 312 shows four tabs 318 and three recesses 320. The inner side of each tab 314 engages the bottom of the respective recess 320; and the inner side of each tab 318 engages the bottom of the respective recess 316. Thus the perpendicular positioning is determined during the forming of the sheet metal parts. The two walls 310 and 312 may be formed as separate sheet metal pieces; or they may be bent up from flaps formed integrally with the sheet metal floor. If additional assurance of wall perpendicularity is desired, an additional metal piece 322, having orthogonal flanges 324, may be inserted into the space inside the walls. As a finishing procedure, the walls may be secured together by spot welding, or they may have a continuous welding seam. Generally, after welding, a grinding step is desirable in order to provide a smooth, round outer corner.

Figure 32:
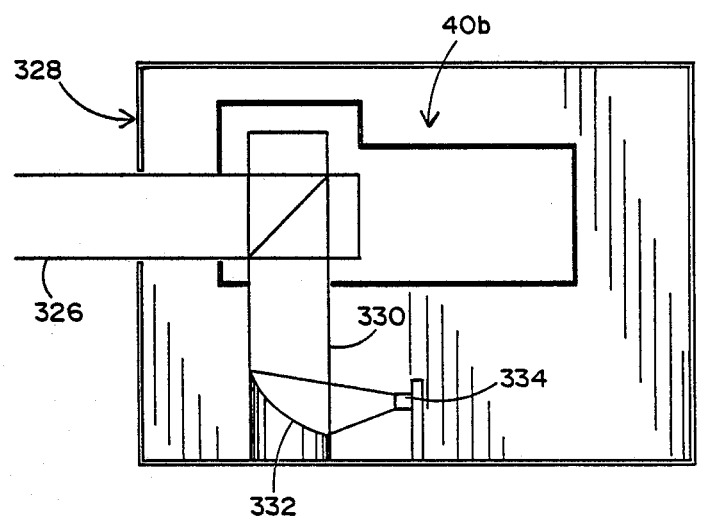
FIG. 32 is a plan view of another embodiment, which is a passive, remote optical system.

FIG. 32 shows a partial spectrometer structure which incorporates the concepts of the present invention into a minimal system, characterized as a passive, remote optical system. An incoming beam 326, which contains the radiation to be measured, enters a sheet metal structure 328, and passes through interferometer 40b. The interferometer exiting beam follows path 330 to a parabolic mirror 332, which focuses the beam at a detector 334. As in previous embodiments, the body of mirror 332 is secured directly to wall of the structure 328.

FIGS. 33-36 show available types of positioning combinations. It appears that the half-shear combination is the preferred structure. FIGS. 33A and 33B show a half-shear projection 336 formed in a plate 338; projection 336 extends into a slot 340 formed in a plate 342.

FIGS. 34A and 34B show a half-shear projection 344 formed in a plate 346; projection 344 extends into hole 348 formed in a plate 350. In the half-shear process, the pin-shaped projection is sheared from the plate, but only pushed part way through the sheared hole.

FIGS. 35A and 35B show arched projections formed in one plate, and engaged by a surface of another plate. A first projection 352 formed in a plate 354 engages a surface 356 on a plate 358, in order to prevent relative motion in a first direction. A second projection 360 formed in plate 354 engages another surface 362 on plate 358, in order to prevent relative motion in a second direction.

FIG. 36 shows a tab and slot combination. A tab 364, projecting from the lower end of a plate 366, is adapted to fit into a slot 368, formed in a plate 370, which extends in a plane perpendicular to the plane of plate 366. In all of the above positioning combinations, clearances no greater than 0.003 inch can be maintained.

From the above description, it is clear that a thorough redesign of spectrometer structures and sub-structures has been accomplished, and that very significant cost reductions can be accomplished in the manufacturing process.

As previously stated, another major cost reduction results from the elimination of complex and expensive mirror adjustment devices. In addition to close-tolerance location of the mirror supports, this requires the use of mirror manufacturing processes which provide exact dimensional repeatability of the mirror unit. Not only must the mirror face be properly contoured and have adequate reflectivity; but also the position of the mirror face relative to the mounting structure must be accurately maintained.

The usual mirror-forming process involves grinding and polishing of glass optical elements. After forming the reflective surface, the mirror must be secured to a backing element, which in turn is secured by suitable fasteners to a supporting member. The process has two disadvantages. It is not easily, or accurately, repeatable; and the distance and angle between the mirror's reflective face and the supporting member tends to vary. For these reasons, it has been customary to provide mirror adjustment parts, and to carefully align each mirror by manipulating such adjustment parts.

The present invention eliminates the costs both of the adjustment parts and of the aligning procedure by using a mirror-forming process which provides a precisely-repeatable focal length, and which holds to a close tolerance the location of the reflecting face of the mirror with respect to its supporting member.

At present, diamond-forming of a reflecting surface on an aluminum mirror body is the preferred mirror-forming method. This is a lathe-turning process which can be held to very accurate dimensions. Since the mirror surface is integral with its body, it can be directly fastened to the supporting member. As stated above, dowels are used to align openings in the back of the mirror with openings in the sheet metal surfaces of the supporting structure or mirror-mounting brackets. Threaded fasteners are then used to clamp the back of the mirror to the sheet metal surface or bracket.

The mirror surface forming process is referred to as micro-surface generating, single-point diamond machining, or micro-machining. It involves the use of single point diamond cutting tools, and high accuracy, low vibration two-axis lathes.

Because the diamond cutting tool leaves a tooling mark on the mirror surface, this process is not recommended for mirrors reflecting visible, or relatively short wavelength, radiation. However, it is very satisfactory for mirrors in infrared radiation systems.

Another potential mirror-forming method is plastic molding. Optical surfaces may be accurately formed by injection molding, using such materials as acrylic, polystyrene, and polycarbonate. Use of this plastic molding method would permit a higher production rate, and lower part cost, than the diamond cutting process. Although aspheric mold making is very complex, the manufacturing process is relatively straightforward, once the mold has been formed.

From the foregoing description, it will be apparent that the apparatus and method disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A spectrometer structure, in which radiation passes from a source, through a modulator, to a detector, comprising:
   a first sheet metal support-providing surface formed by means of punching and/or bending processes;
   a second sheet metal support-providing surface formed by means of punching and/or bending processes;
   a third sheet metal support-providing surface formed by means of punching and/or bending processes;
   each of the three support-providing surfaces including, as a result of the punching and/or bending processes, means for determining its final location with respect to each of the other support-providing surfaces;

each of the three support-providing surfaces (a) engaging each of the other support-providing surfaces, (b) extending generally in a different plane from each of the other support-providing surfaces, and (c) being rigidly secured to and non-adjustable positioned relative to each of the other support-providing surfaces; and a mirror member for reflecting radiation in the spectrometer, said mirror having a body portion which is secured to one of the support-providing surfaces, and which is precisely located as a function of the interengagement of the three support-providing surfaces.

2. The spectrometer structure of claim 1 in which one of the sheet metal support-providing surfaces is formed integrally with another of the sheet metal support-providing surfaces as an extension thereof, and is bent away from the latter into its final position.

3. The spectrometer structure of claim 1 in which one of the sheet metal support-providing surfaces is formed separately from another of the sheet metal support-providing surfaces, an has its location with respect to the latter fixedly and non-adjustably determined by means of interengaging projections and recesses formed on the respective surfaces during their punching and/or bending processes.

4. The spectrometer structure of claim 1 in which the mirror member has a curved reflecting surface on its body portion, and a flat surface on its body portion which engages and is secured to one of the sheet metal support-providing surfaces.

5. The spectrometer structure of claim 4 in which the flat surface of the body portion of the mirror member has a plurality of positioning recesses formed therein which locate the body portion while the curved reflecting surface is being formed, and also locate the body portion with respect to the sheet metal support-providing surface which it engages in the final structure.

6. The spectrometer structure of claim 2 which comprises:

a plurality of wall-forming sheet metal surfaces provided by bent up flaps formed integrally with one of the sheet metal support-providing surfaces.

7. The spectrometer structure of claim 6 in which the adjacent wall-forming members of the structure have inter-engaging projection an recess sets which ensure perpendicularity of the wall-forming surfaces with respect to the integral sheet metal support-providing surface.

8. The spectrometer structure of claim 1 which comprises:

a sheet-metal bracket having at least two integral flanges extending in different directions;

one of the bracket flanges being the support-providing surface to which the mirror body is secured, said flange having two edges each of which is located with respect to one of the other support-providing surfaces by matching projection and recess sets which are formed in the respective surfaces during the punching processes.

9. A spectrometer structure in which radiation passes from a source, through a modulator, to a detector, comprising;

a chassis having a supporting platform formed of sheet metal;

one or more optical-element-supporting members formed of sheet metal;

the optical-element-supporting members being perpendicular to the platform and having their positions relative to the platform automatically and completely determined as a result of the sheet metal forming processes; an one or more optical elements secured to the optical element-supporting members and arranged to direct radiation in the spectrometer.

10. The spectrometer structure of claim 9 in which the chassis includes:

an interferometer mounted on the platform, whose location with respect to the platform is determined solely by the sheet metal forming processes; and a detector mounted on the platform, whose location with respect to the platform is determine solely by the sheet metal forming processes.

11. The spectrometer structure of claim 10 in which the supported optical elements include:

a first parabolic mirror near the interferometer which receives collimated radiation leaving the interferometer and reflects a pre-sampling focusing beam; and a second parabolic mirror near the detector which recollimates post-sample radiation.

12. The spectrometer structure of claim 10 in which:

the interferometer is partially enclosed by the platform and by three side walls formed integrally with the platform and turned perpendicularly with respect to it.

13. The spectrometer structure of claim 11 in which each of the members supporting the first and second parabolic mirrors is a stamping having a mirror-supporting flange and a stiffening flange perpendicular to the mirror-supporting flange.

14. A spectrometer structure, for use in sample analysis, comprising:

a chassis, formed by punching sheet metal, which includes a platform, and interferometer enclosing section, and a detector enclosing section;

a first mirror-supporting bracket located in the interferometer section, formed by punching sheet metal, and having its sides perpendicular to the platform;

a second mirror-supporting bracket located in the detector section, formed by punching sheet metal, and having its sides perpendicular to the platform;

a first unitary mirror-providing element having a reflecting surface which reflects radiation toward the sample, and a rear surface secured directly and non-adjustably to the first mirror-supporting bracket; and a second unitary mirror-providing element having a reflecting surface which reflects radiation coming from the sample, and a rear surface secured directly and non-adjustably to the second mirror-supporting bracket.

15. A spectrometer structure comprising:

a chassis, formed by punching sheet metal, and having an interferometer section and a detector section;

the chassis providing a supporting platform;

a first mirror-supporting member located at the interferometer section, formed by punching sheet metal, and having its side perpendicular to the supporting platform;

a second mirror supporting member located at the detector section, formed by punching sheet metal, and having its sides perpendicular to the supporting platform;

a first unitary mirror-providing element having a parabolic reflecting surface which reflects radiation into a sample area, and a rear surface secured directly and non-adjustably to a side of the first mirror-supporting member; and a second unitary mirror-providing element having a parabolic reflecting surface which reflects radiation coming from a sample area, an a rear surface secured directly and non-adjustably to a side of the second mirror-supporting member.

16. The spectrometer structure of claim 15, which also comprises:

positioning means for each mirror-providing element which establishes its location with respect to its supporting member, and which also determines the position of its parabolic reflecting surface during formation of that surface.

17. The spectrometer structure of claim 15 wherein the sheet metal chassis includes:

three integral vertical side walls of the interferometer section; and three integral vertical side walls of the detector section.

18. The method of fabricating a spectrometer structure, in which radiation is directly by mirror elements from a source, through a modulator, to a detector, which method comprises:

forming by punching and/or bending processes a first sheet metal element to serve as a platform;

forming by punching and/or bending processes a second sheet metal element to provide a mirror-supporting surface, said second element extending at an angle to the platform;

forming by punching and/or bending processes a third sheet metal element to serve as a stiffening member, said third element extending at an angle to the platform and at an angle to the mirror-supporting surface;

the three sheet metal elements being rigidly held together in relative positions precisely and non-adjustably determined during their punching and/or bending forming processes; and mounting a mirror-providing element on the second sheet metal element in a position to reflect radiation in the spectrometer.

19. The spectrometer structure fabricating method of claim 18 in which both the second and third sheet metal elements are perpendicular to the platform.

20. The spectrometer structure fabricating method of claim 18 which comprises:

forming at least one of the second or third sheet metal elements as an integral extension of the first sheet metal elements; and bending the integral extension to provide a wall perpendicular to the platform.

21. The spectrometer structure fabricating method of claim 18 which comprises:

forming the first sheet metal element with at least two integral extensions, having matching projections and recesses along their edges, bending the integral extensions to provide interengaging walls perpendicular to the platform; and causing the matching projections and recesses to interlock in order to provide a mutually-reinforcing wall corner.

22. The spectrometer structure fabricating method of claim 18 which comprises:

forming the first sheet metal element with four integral extensions;

bending the four extensions into positions in which they provide walls perpendicular to the platform, an their edges engage the adjacent walls to enclose the area of the platform.

23. The spectrometer structure fabricating method of claim 18 which comprises:

forming at least two of the sheet metal elements as separate elements, each having integral precisely-located position-determining projections or mating surfaces;

positioning the two sheet metal elements in engagement with one another in the relative locations fixed by interengagement of their projections and mating surfaces; and securing the two elements together rigidly and non-adjustably.

24. The spectrometer structure fabricating method of claim 23 in which the two elements are secured together by welding.

25. The spectrometer structure fabricating method of claim 18 which also comprises:

forming the mirror-providing element as a one-piece element; and securing that element directly and non-adjustably to the second sheet metal element.

26. The method of fabricating a spectrometer structure, in which radiation is directed by mirror elements from a source, through a modulator, to a detector, which method comprises:

forming a supporting structure adapted to support a mirror;

forming a mirror body having a rear surface which includes integral position determining means;

shaping reflecting surface on the front surface of the mirror body with the mirror body positioned by the position-determining means;

mounting the rear surface of the mirror body on the supporting structure; and locating the mirror body with respect to the supporting structure by the integral positioning-determining means, so that the mirror reflecting surface is positioned to reflect radiation in the spectrometer.

27. A spectrometer structure, in which radiation is directed by mirror elements from a source, through a modulator, to a detector, comprising:

a first sheet metal element formed by punching and/or bending processes to serve as a platform;

a second sheet metal element formed by punching an/or bending processes to provide a mirror-supporting surface, said second element extending at an angle to the platform;

a third sheet metal element formed by punching and/or bending processes to serve as a stiffening member, said third element extending at an angle to the platform and at an angle to the mirror-supporting surface;

the three sheet metal elements being rigidly held together in relative positions precisely and non-adjustably determined during their punching and/or bending forming processes; and a mirror-providing element mounted on the second sheet metal element in a position to reflect radiation in the spectrometer.

28. The spectrometer structure of claim 27 in which the second and third sheet metal elements are perpendicular to the platform and to one another.

29. The spectrometer structure of claim 27 in which:
the first sheet metal element has four integral extensions which have been bent into positions in which they provide walls perpendicular to the platform, and their edges engage the adjacent walls to enclose the area of the platform.

30. The spectrometer structure of claim 27 in which:
at least two of the sheet metal elements are separately formed elements, each having integral precisely-located position-determining projections or mating surface; an
the two sheet metal elements are: (a) in engagement with one another in the relative locations fixed by interengagement of their projections and mating surfaces, and (b) secured together rigidly and non-ajustably.

31. The spectrometer structure of claim 30 in which the two elements are welded together.

32. A spectrometer structure, in which radiation passes from a source, through a modulator, to a detector, comprising:
a supporting platform;
a mirror-supporting element mounted on the platform; and
a unitary mirror body having a parabolic front reflecting surface an a flat rear surface non-adjustably secured to the mirror-supporting element;
the rear surface of the mirror body having integral positioning means which serve both to locate it during shaping of its front reflecting surface, and to determine its position on the mirror-supporting element.

* * * * *

UNITED STATES PATENT AND TRADEMARK OFFICE
CERTIFICATE OF CORRECTION

PATENT NO. : 4,810,092

DATED : March 7, 1989

INVENTOR(S) : Gerald L. Auth

It is certified that error appears in the above-identified patent and that said Letters Patent is hereby corrected as shown below:

Column 3, line 36: Change "o" to -- to --

Column 8, line 62: Change "12" to -- 312 --

Column 9, line 24: After "to", insert -- a --

Column 11, line 5: Change "non-adjustable" to -- non-adjustably --

Column 11, line 22: Change "an" to -- and --

Column 11, line 47: Change "an" to -- and --

Column 12, line 5: Change "an: to -- and --

Column 12, line 38: Change "and" to -- an --

Column 13, line 8: Change "an" to -- and --

Column 13, line 25: Change "directly" to -- directed --

Column 14, line 36: After "shaping", insert -- a --

Column 15, line 11: Change "surface" to -- surfaces --; change "an" to -- and --

Column 16, line 10: Change "an" to -- and --

Signed and Sealed this

Twenty-seventh Day of February, 1990

*Attest:*

JEFFREY M. SAMUELS

*Attesting Officer*    Acting Commissioner of Patents and Trademarks